US012755420B2

(12) United States Patent
Gonzalez Aguirre

(10) Patent No.: US 12,755,420 B2
(45) Date of Patent: Oct. 6, 2026

(54) HUMAN-ROBOT COLLABORATION FOR 3D FUNCTIONAL MAPPING

(71) Applicant: Intel Corporation, Santa Clara, CA (US)

(72) Inventor: David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 18/373,573

(22) Filed: Sep. 27, 2023

(65) Prior Publication Data

US 2024/0312050 A1 Sep. 19, 2024

Related U.S. Application Data

(60) Provisional application No. 63/452,071, filed on Mar. 14, 2023.

(51) Int. Cl.

| | |
|---|---|
| ***G06T 7/73*** | (2017.01) |
| ***G06F 3/01*** | (2006.01) |
| ***G06F 3/16*** | (2006.01) |
| ***G06V 10/70*** | (2022.01) |
| ***G06V 10/94*** | (2022.01) |
| ***G06V 20/50*** | (2022.01) |
| ***G06V 20/70*** | (2022.01) |

(Continued)

(52) U.S. Cl.
CPC ................ *G06T 7/73* (2017.01); *G06F 3/013* (2013.01); *G06F 3/167* (2013.01); *G06V 10/70* (2022.01); *G06V 10/945* (2022.01); *G06V 20/50* (2022.01); *G06V 20/70* (2022.01); *G10L 15/1815* (2013.01); *G10L 15/22* (2013.01); *G06T 2207/20081* (2013.01); *G06T 2207/20092* (2013.01)

(58) Field of Classification Search
CPC ............ G06T 7/73; G06T 2207/20081; G06T 2207/20092; G06F 3/013; G06F 3/167; G06V 10/70; G06V 10/945; G06V 20/50; G06V 20/70; G10L 15/1815; G10L 15/22; G10L 15/26
See application file for complete search history.

(56) References Cited

U.S. PATENT DOCUMENTS

2008/0266254 A1* 10/2008 Robbins .................. G05G 1/04 345/161
2014/0169011 A1* 6/2014 Tsai .................... A42B 3/0453 362/464
2022/0387128 A1* 12/2022 Bail .................... A61B 90/361
(Continued)

*Primary Examiner* — Nga X Nguyen
(74) *Attorney, Agent, or Firm* — Banner & Witcoff, Ltd.

(57) ABSTRACT

Various aspects of techniques, systems, and use cases may be used for human-robot collaboration for three-dimensional (3D) functional mapping. An example technique may include receiving identification of a direction or location based on a user gaze identified via an extended reality device, causing environmental data of an environment to be captured using a sensor of a robotic device corresponding to the direction or location based on receiving the identification, and detecting, within the environmental data, at least one physical feature of the environment. The example technique may include determining, from a user input, an annotation to apply to the at least one physical feature, and labeling the at least one physical feature with the annotation.

17 Claims, 13 Drawing Sheets

(51) Int. Cl.

| | |
|---|---|
| ***G10L 15/18*** | (2013.01) |
| ***G10L 15/22*** | (2006.01) |

(56) References Cited

U.S. PATENT DOCUMENTS

| | | | | |
|---|---|---|---|---|
| 2023/0196681 | A1* | 6/2023 | Madden | G06T 7/70 345/419 |
| 2024/0087160 | A1* | 3/2024 | Ebrahimi Afrouzi | G06T 7/50 |
| 2024/0112426 | A1* | 4/2024 | Berliner | G06F 3/012 |
| 2024/0427313 | A1* | 12/2024 | Usher | B25J 9/1689 |

* cited by examiner

HUMAN-ROBOT COLLABORATION FOR 3D FUNCTIONAL MAPPING

PRIORITY CLAIM

This application claims the benefit of priority to U.S. Provisional Patent Application Ser. No. 63/452,071, filed Mar. 14, 2023 and titled "HUMAN-ROBOT COLLABORATION FOR 3D FUNCTIONAL MAPPING", which is incorporated herein by reference in its entirety.

BACKGROUND

Robots and other autonomous agents may be programmed to complete complex real-world tasks. Robotics use artificial intelligence (AI) to perform tasks in industrial environments. Robotics span a wide range of industrial applications, such as smart manufacturing assembly lines, multi-robot automotive component assembly, computer and consumer electronics fabrication, smart retail and warehouse logistics, robotic datacenters, etc. Often robots interact with humans to complete tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
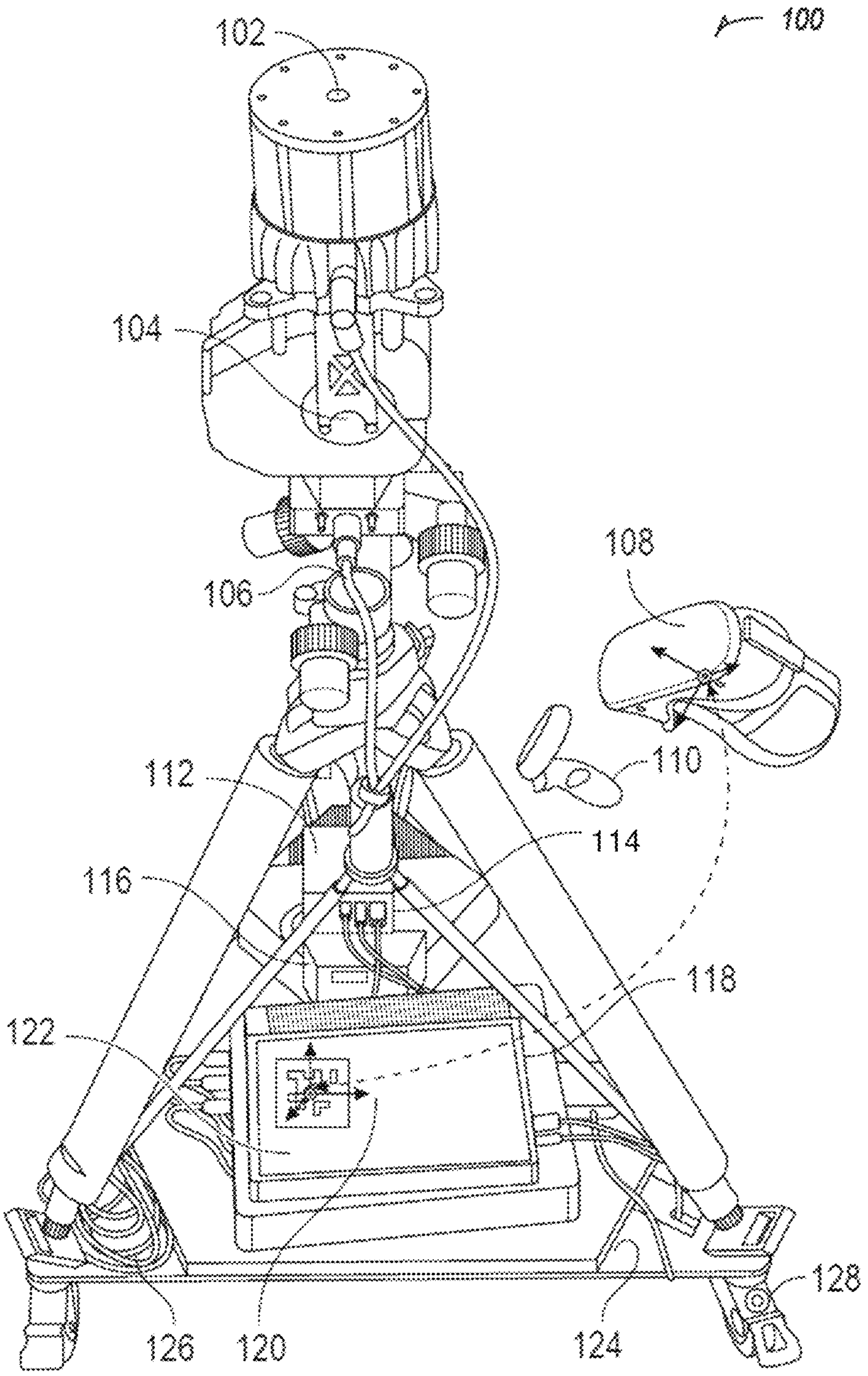
FIG. 1 illustrates an implementation of XR-based human-robot collaboration for functional mapping according to an example.

Systems and techniques described herein provide technical solutions to effectively capture functional-attributes and application-specific cues via user interactions (e.g., with a robot and environment) such as for enhancing a 3D map of a building. For example, precision and repeatability of cost-effective pan-tilt-units and LIDARS may be used along with a tagging process of human-knowledge, scene-understanding, and interactions with the premises via a mixed reality interface.

The systems and techniques described herein may ensure the machine learning capabilities of the robotic-mapping platform minimize or improve cognitive and physical work-load (e.g., with respect to scene understanding, language bootstrapping, or geometric modeling) for surveyors engaged in mapping and tagging tasks exploiting tri-modal affordances or object-action pairs. The pairs may include using language cues, extended reality (XR) hand-held annotations, or consistently sampled 3D point clouds. Extended reality may include virtual reality, mixed reality, augmented reality, or the like.

The systems and techniques described herein provide a simultaneous 3D surveying and XR interactive tagging method via a semi-automatic mobile robot-mapping system. For example, a user may control a robot to steer and collaborate with the robot during a mapping process while tagging regions or objects in an environment. The objects may include observable or implicit attributes, and the tagging may be done in real-time or near real-time via interactions within an immersive interface.

An example human-robot collaboration interface may be used with voxel connectivity or density driven LIDAR steering, for example towards a region lacking point-sampling consistency. An optimized (e.g., for sampling and coverage) regularity guaranty may be achieved by the systems and techniques described herein, such as producing an improved map for downstream tasks in functional-tagging, segmentation, or surface-modeling. Robust 7D (e.g., 6D Pose+1D Time) registration between a sensor-actor unit (e.g., pan-tilt-unit and LIDAR) of a robot and an XR-HMD (extended Reality Head Mounted Display) may be used together. Language or ontology-based spatial affordance exploitation (e.g., extraction or ranking) may be used for reliable cue insertion during functional-tags mapping.

LIDAR-based mapping may work with an instrumentation diversity focus on multi-sensor fusion for concurrent mapping, re-localization, or loop-closure in autonomous systems. Example Simultaneous Localization and Mapping (SLAM) or computer graphics methods may be used to address online mapping developing sound state-estimators and scalable back-end spatial representations. Sparse volumetric representations based on binary partition spaces may be used for dependable performance and scalability.

The systems and techniques described herein may provide map coverage guarantees during or after the scanning process for a user. A user may tag attributes in-situ while checking for structural, density, or overall consistency. This may be particularly useful to prevent additional scanning sessions (e.g., especially in distant locations).

The systems and techniques described herein allow for leveraging the actions of the surveyor (in the world and via XR controllers) to provide cues in rapid and intuitive manner for variety of emerging usages. For example, the systems and techniques described herein may be used to map articulated elements (such as door or windows), for example by open and closing the articulated element.

FIG. 1 illustrates an implementation of XR-based human-robot collaboration system 100 for functional mapping according to an example. FIG. 1 includes an example implementation of a XR-based Human-robot Collaboration for Functional Mapping. The example robotic system 100 includes a robot having one or more components (some maybe optional, but are provided in FIG. 1 for completeness), such as LIDAR 102, PTU 104, Tripod 106, PC 112, Switch 114, Data-storage 116, Power-supply 118, Display 120, April-tag 122, Mounting platform 124, Electrical-mezzanine 126, and Locking-wheels 128. A user device, such as a head mounted display 108 or a hand-held control 110 may be used to control or interact with the robot.

Building function attributes play essential roles in understanding and empowering human activities inside buildings. For example, bidirectionally connecting the tangible world with its digital counterpart is fundamental for physically-grounded virtual applications. For example, in robot-automation, space-time analytics, or extended Reality (XR) gaming, the ability to capture, model, and exploit dynamic environments is essential. By physically grounding the virtual applications, tangible and digital premises may be unified. The unification process may use intelligent capabilities built on geometric and functional attributes connected to detailed spatial occupancy maps that are free of gaps and up-to-date 3D models of an environment.

To create and democratize physically grounded virtual application benefits, the example robotic system 100 may be used to enable non-experts to easily capture, tag, and exploit gap-free, semantic, and functional-endowed 3D models of buildings.

Spatial mapping may include structure-and-appearance captured through range and photometric devices, or contextual functional-grounding (for example with actionable attributes) captured by human-robot collaboration. In an example, a relevant object may be captured in-situ with spatial clues available to a user that are not observable off-line from recorded raw spatial data, for example articulated objects such as doors/windows with respect to opening direction. Tagging of objects and their significant parts may include identifying a key function, such as with a badge reader, a door-opening button, a fire extinguisher, a light switch, etc. In some examples, safety or security attributes of a room, fixed-machine, or tool may be annotated or tagged. This may be used in manufacturing, financial, or health-care domains where assets include application-specific attributes for productive, safe, and secure operations.

Figure 2:
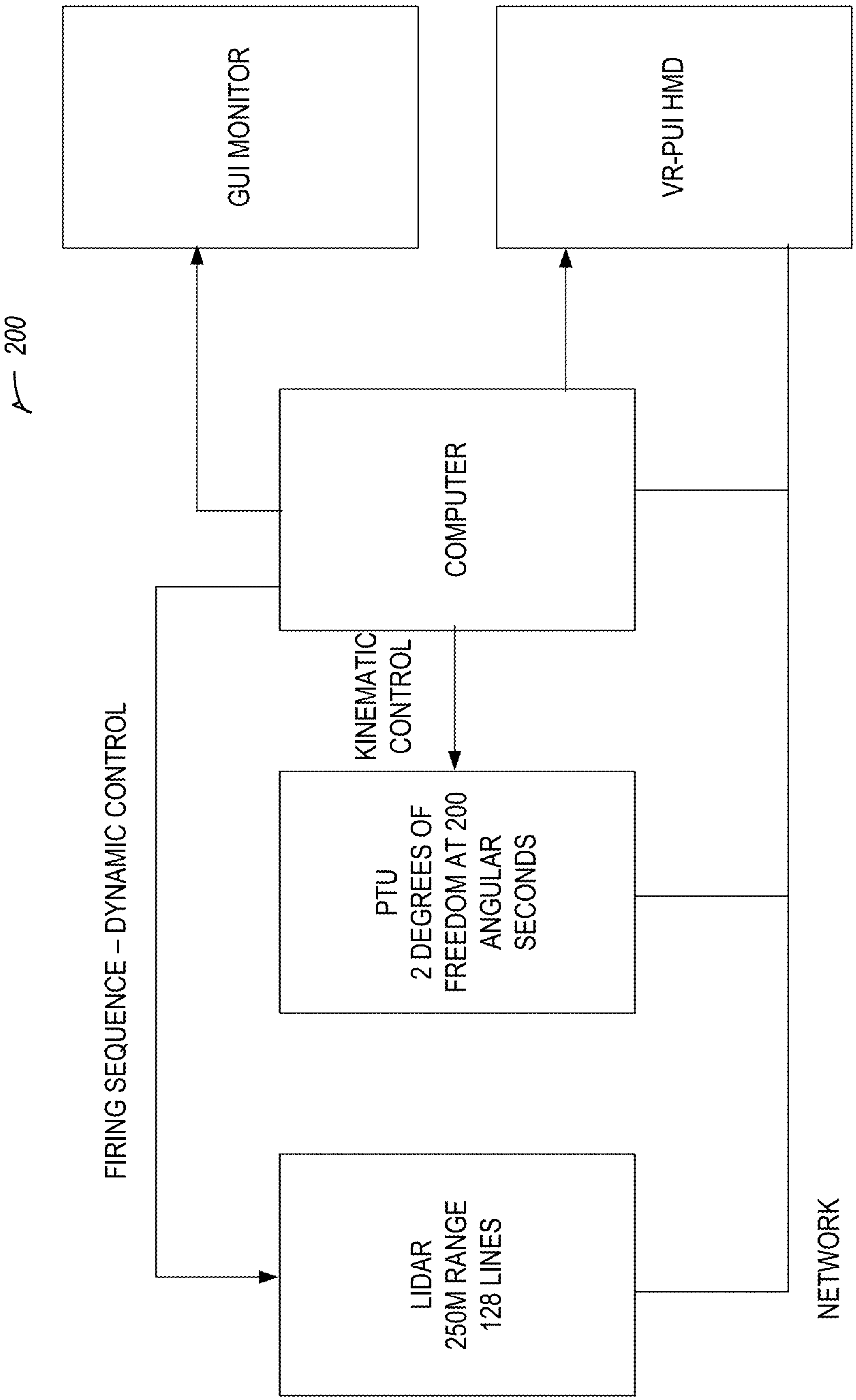
FIG. 2 illustrates a 3D mapping block diagram according to an example.
Figure 3:
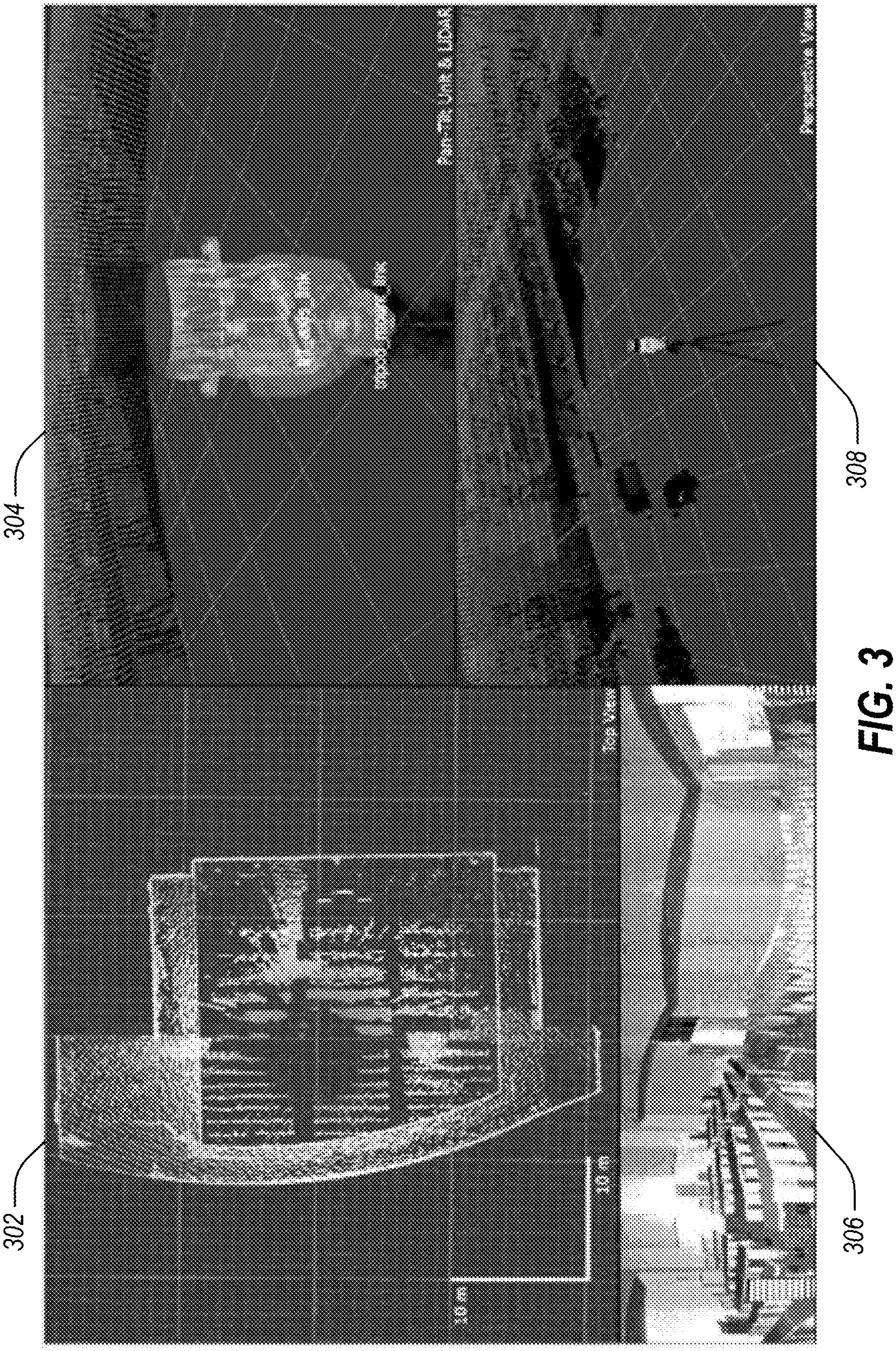
FIG. 3 illustrates example 3D mappings according to an example.

FIG. 2 illustrates a 3D mapping block diagram 200 according to an example. FIG. 3 illustrates example 3D mappings according to an example. The block diagram 200 or the 3D mappings of FIG. 3 may be used for 3D mapping for physically-grounded VR (e.g., virtual or augmented) applications.

FIG. 2 includes a system block composition and data streams, including Virtual Reality (VR) and a Perceptual User Interface (PUI). Mapping 302 of FIG. 3 illustrates a real-time Graphic User Interface (GUI) view including a scan of a large (e.g., around 1000 square meters) room. Mapping 302 is a top down view that displays a scanning-spot ω0 where a color-map denotes point's height. Mapping 306 is a reflectance image that includes point-wise appearance cues for segmentation. Mappings 304 and 308 are close-up and perspective images respectively. The mappings 304 and 308 may include kinematic frames for user feedback to ensure proper operation of a digitalization and tagging process while map coverage is being conducted.

Combining complementary capabilities of humans and robots leads to innovative solutions producing synergistic mapping and functional tagging tools for deploying spatial-AI services. By supplying intuitive and proactive (initiative-taking) interfaces for users, the robot may be commanded in an intuitive and direct or indirect manner. This allows a surveyor to harvest the repeatability and precision of the robot (e.g., for gap-free maps), see an experimental overview, and have the robot cooperatively address the contextual and semantic understanding. When extracting, ranking, or presenting functional proposals to the surveyor for fast tagging, machine learning may be used (e.g., at the robot). General intelligence (e.g., about the situations in the building, decisions, use of objects, etc.) may be delegated to the human.

FIG. 2 includes using LIDAR for example at 250 meter range, a PTU with two degrees of freedom, and a computer to control an extended reality device. Dynamic or kinematic control may be generated by the computer. A display device (e.g., a graphical user interface) may be connected to the computer.

Figure 4C:
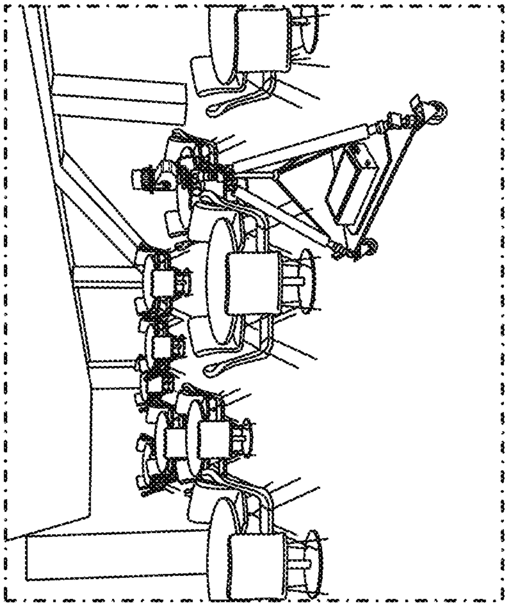
FIGS. 4A-4C illustrate robotic mapping in physically-grounded applications according to an example.
Figure 4B:
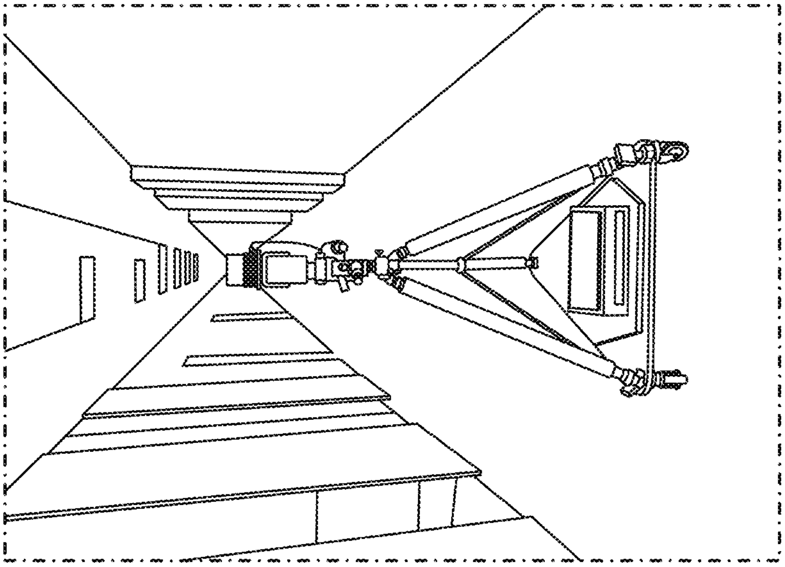
Figure 4A:
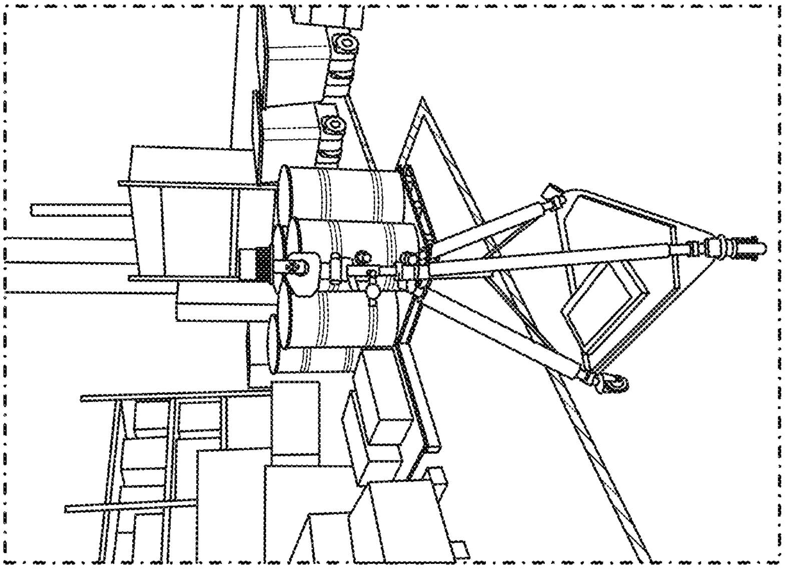

FIGS. 4A-4C illustrate robotic mapping in physically-grounded applications according to an example. Mapping in physically-grounded XR (e.g., virtual or augmented applications) examples are shown in FIGS. 4A-4C. 3D mapping of common spaces such as large corridors, auditoriums with soaring ceilings, diversity of materials and multiple levels connected via elevators and stairs are demanding settings for sensors, actuators, and a robot platform's form factors. Semi-automatically, rapidly, and long-lasting operation on batteries for scan environments produce gap-free point clouds with regular sampling density ensuring a pragmatic spatial foundation for holistic multi-modal representations.

The systems and techniques described herein may be used for attracting workloads and emerging use-cases of spatial-AI, propel and support sensing, digital-twin and robotics strategy for virtual or automation workloads. The robotic platform and algorithms described herein improve the mapping process by ensuring sampling regularity, increasing spatial coverage capturing structure and reflectance appearance, rejecting outlier points, and reducing mapping time.

Figure 5:
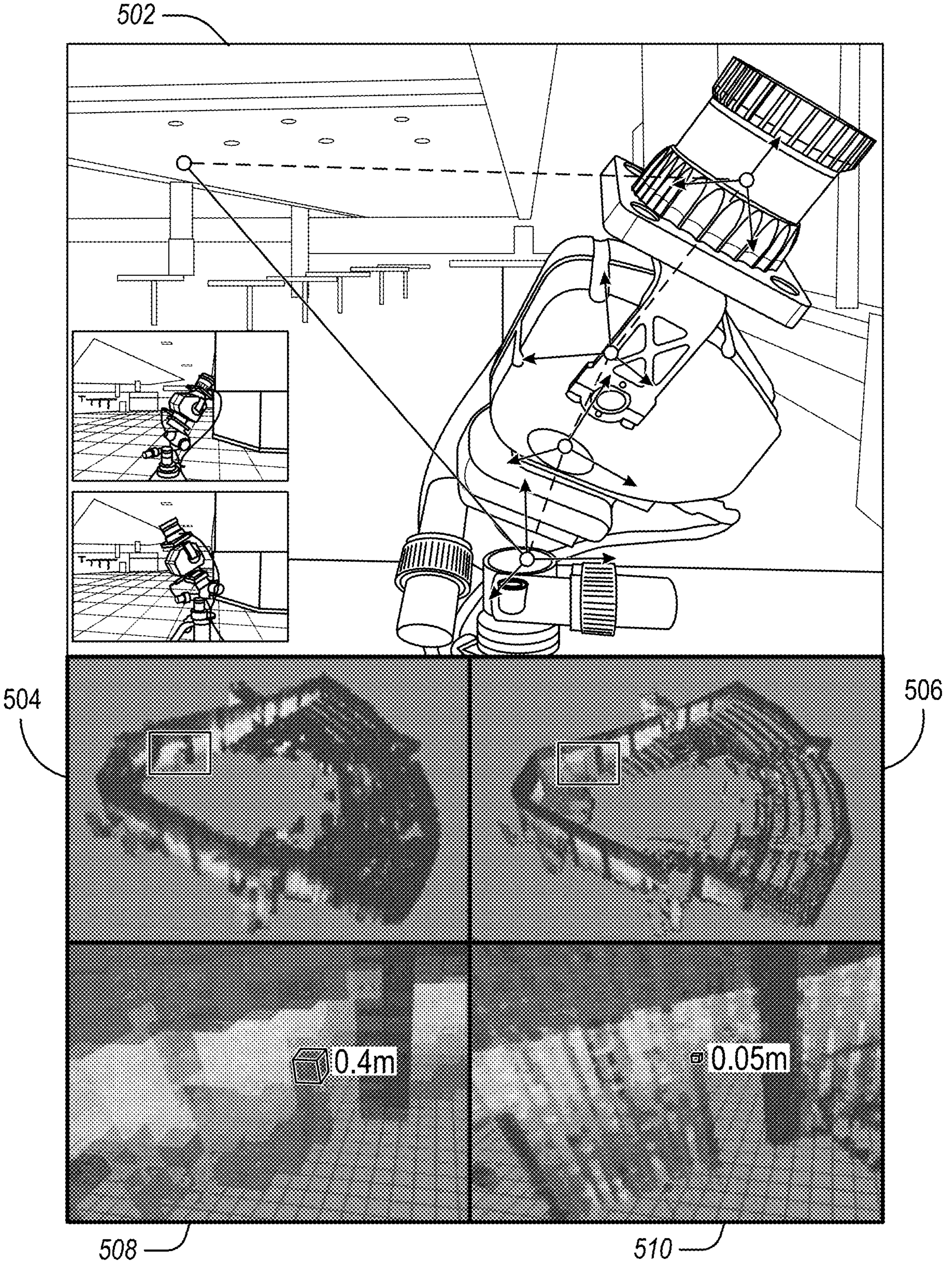
FIG. 5 illustrates a mobile system with a long-range LIDAR and a Pant-Tilt Unit (PTU) and example mappings according to an example.

FIG. 5 illustrates a mobile system (shown in image 502) with a long-range LIDAR and a Pant-Tilt Unit (PTU) and example mappings according to an example. The mobile system is composed of a long-range LIDAR and a Pant-Tilt Unit (PTU) with two controllable axes (for example at 0.05°) and joint resolution (e.g., exposing 0.1° repeatability). Real-time computations and rendering may be smoothly managed by processing circuitry, such as a Next Unit of Computing (NUC), for example an Intel® NUC running a Robot Operative Systems (ROS) stack, optionally with custom interactive visualizations. Images 504, 506, 508, and 510 illustrate initial and adaptively enhanced scans at 0.4 m and 0.05 m voxel size in a room.

Robot-based uniform-coverage and high-resolution lidar mapping may be obtained using voxel connectivity and density driven LIDAR steering towards regions lacking point-sampling consistency. For example, optimized (e.g., over sampling and coverage) may be enforced to obtain a map for downstream tasks such as functional-tagging, segmentation, or surface-modeling.

A coarser volumetric-scanning may be used for discovery mapping. After a user positions the mapping platform to an initial scanning spot Ω_0 (see FIG. 3, for example). The PTU may be sent to a zenith configuration (e.g., αz, βz), which is the orientation parallelly aligning the LIDAR's optical axis with its built-in IMU's acceleration vector (e.g., the sensed earth's gravity direction). This ensures the z-axes has an orientation consistency among scanning spots Ω_i. Next, a low-resolution global scan Ω_0 may be conducted, for example a PTU motion sequence collecting LIDAR points in a fixed traversal (e.g., as shown in FIG. 5) and pseudo-code in Algorithm 1:

- Point cloud: scene points $x_L^t \in R^3$ are captured by the LIDAR at synchronized time t (with respect to optical frame L).
- Joint-state streaming: with the robot's kinematic chain (e.g. formatted) and the tilt's angle (e.g., measured at 250 Hz in $-\pi/2 \le \beta_t \le \pi/4$), a rigid transformation $T_\beta^t$ describes the instantaneous rotation by the angle $[\![\beta]\!]_t$.
- Dynamic tilt transformation: $T_\beta^t$ maps points $x_L^t$ into the tilt's frame as $[\![x]\!]_\tau^t = T_\beta^t [\![x]\!]_L^t$.
- Dynamic pan transformation: Using the pan's angle ($-\pi \le \alpha_t \le \pi$), the pan axis transformation is $T_\alpha^t$.
- Space-time registration: Combining both time-varying transformations, all scene points may be mapped into a single pose invariant frame ($T_\omega$ located at the platform's base) yielding a set of atemporal points $[\![x]\!]_\omega = T_{(\alpha)}^t + T_B^t [\![x]\!]_L^t$.

Algorithm 1. Multi-Scan Point Cloud Temporal Registration

In the Algorithm 1, Tw may include one of multiple platform-stationary poses used to create a complete occlusion-invariant map. Scanning spots Ω may include about 2.6 million points per second collected during the scan trajectory ∪i, j (ai, bj) for a 360°×135° coverage. In this phase, a coarse volumetric map describes the spatial occupancy, for example, as shown in image 510 of FIG. 5.

A context-aware scanning path may be generated for regular coverage. This may ensure that coverage occurs for an environment. Once a low-resolution octree (e.g., 0.2-0.4 m voxel) is obtained, an adaptive scanning path is generated. The path objective may maximize spatial information gain while minimizing refinement scanning with respect to traversal length or time. The path approximates a suitable linked sequence of pan-tilt configurations ∪i, j (ai, bj) for an improved volumetric sampling given the coarse scene's knowledge and are unfolded in velocity trajectories as follows.

In some examples, an adaptive map-refinement technique may be used. Point cloud collection along a traversal (ai, bj) may be conducted at low-angular velocity, such as around 0.5-1.5° per second. This velocity may be set inversely to a maximal range detected, for example in a previous stage, to mitigate projecting aperture effects. Smooth scanning motions may be used to avoid joint-state aliasing over the composed kinematics. Sensor data aggregation may occur while the PTU maintains a cruise state or in a stop-scan-and-go fashion for short joint-space distances. This type of sensor data collection prevents jerky encoder measurements and other mechanical uncertainties. Resulting point clouds may fill sensing-feasible LIDAR gaps from the coarse discovery scan.

The map may be improved with respect to uniform-coverage. For example, voxel connectivity is improved in surfaces such as walls, floors, or ceilings. During scanning, the two active axes reduce volumetric gaps (e.g., on soaring ceilings and close to the platform base) compared to non-robotic approaches. On this adaptive-refinement stage, regions may be identified that are stable with respect to their surfaces exposing Lambertian reflectance and low-curvature. Regions revealing complex structures and challenging materials may be detected, for example by higher voxel variance (e.g., observable on LIDAR's revolution-wise octrees) or lower point frequency per voxel in the aggregated map. During this phase, the octree includes a higher resolution map (e.g., 0.0125-0.05 m). The specific resolution may depend on the target application and scanning time budget. For example, FIG. 3 shows a large congress center where the scanning resolution was set to 0.05 m voxels yielding an average ~246.12 see mapping period per each of the eight scanning spots including discovery and refinement phases. This collects more points in voxels with lower point counts. The advantage of conducting point-density (with respect to volume optimizations) is that it provides a minimal sampling density over all surfaces (e.g., useful in downstream task as surface reconstruction) while also increasing map resolution.

Directing beams at key locations disambiguates sensing outliers from thin structures such as wires, foliage, or other complex topologies. There may be regions in the volumetric map that (e.g., due to materials and structural compositions) do not converge with respect to total points per voxel. For example, metallic handrails or large glass windows in corridors may systematically produce reflections, refraction, and multiple LIDAR echoes. Voxels encompassing these regions may use long sampling periods or may not even converge at all. Combining sampling density with time-out provides results in a finite time window.

Figure 6:
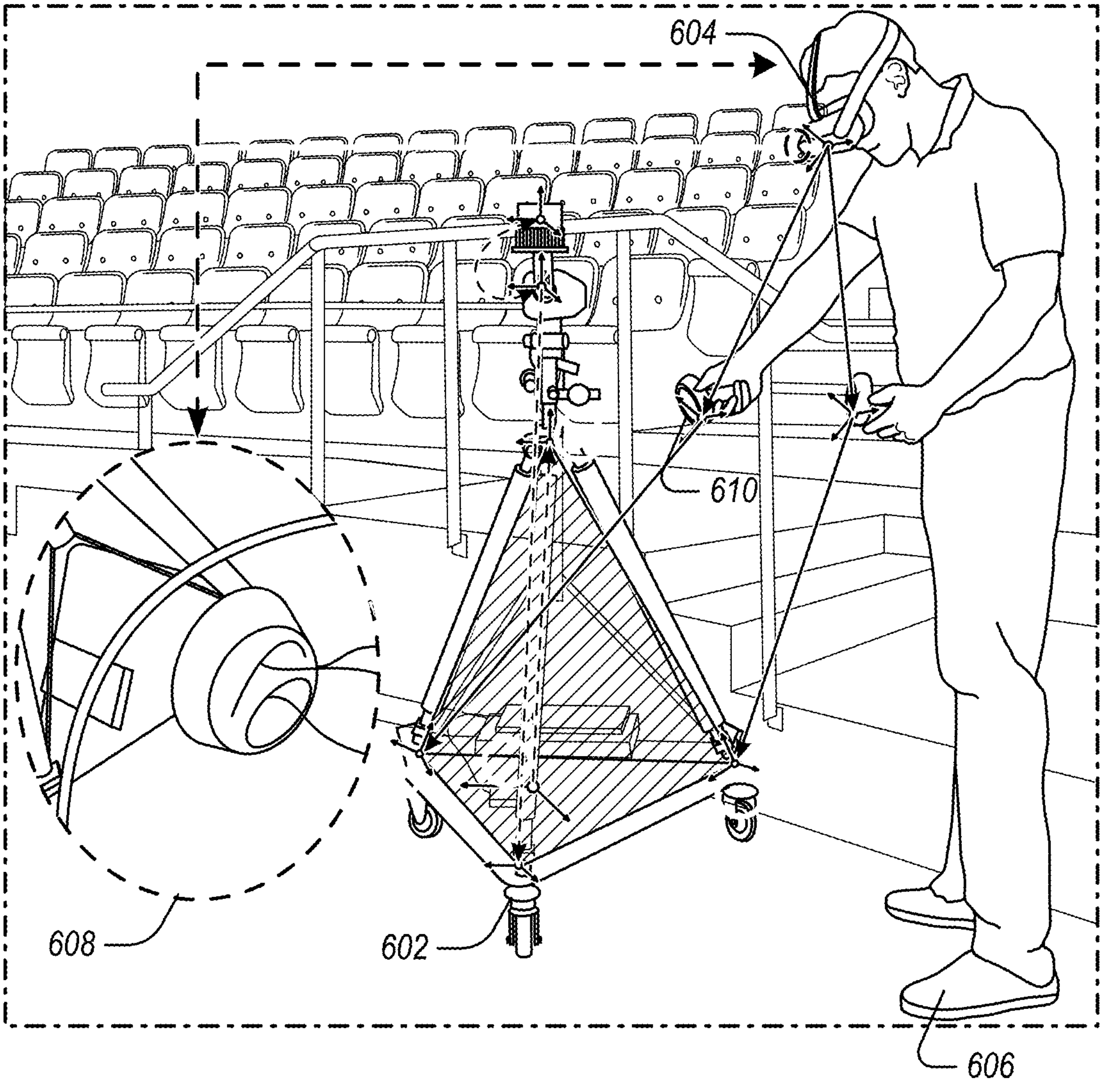
FIG. 6 illustrates a XR to robot tree of kinematic transformation registration via mixed reality marking of a specified support point on the robot according to an example.

FIG. 6 illustrates a XR to robot tree of kinematic transformation registration via mixed reality marking of a specified support point on the robot according to an example. This may include easy and robust 7D (e.g., 6D Pose and 1D Time) registration between sensor-actor unit (e.g., pan-tilt-unit and LIDAR) and XR-HMD (extended Reality Head Mounted Display) exploiting simple and insightful mixed reality interactions between human-robot and XR controllers.

The head-mounted display 604 may be registered to the robot 602 for kinematics. To address continuous 7D (e.g., 6D Pose and 1D Time) registration between the robot 602 as a sensor-actor unit (e.g., pan-tilt-unit and LIDAR) and the XR-HMD (Head Mounted Display) 604 it is possible to exploit multiple approaches. In an example, human capabilities and the invariant shape of the mapping platform may be used. For example, a user 606 wearing the HMD 604 activates a passthrough mode (e.g., a mode in which the HMD 604 allows visibility by displaying real time content of an environment captured by one or more cameras mounted on the HMD 604). By pointing an x-axis of a right hand-held controller 610, a support point $\phi_A$, $\phi_B$ and $\phi_C$ of the platforms may be marked. The ambiguity of data association between point and marking may be made invariant by only keeping a counterclockwise order of the marking order. Then a center point, $\phi_D = \frac{1}{3}(\phi_A + \phi_B + \phi_C)$, may act as the center of a rigid frame $T_v \in SE^3$ and the tree points may be used define to a rotation via orthogonalization. Hence, the registration of known robot frame base $T_b \in SE^3$ is assumed to be $T_v$. Because this manual marking is prone to noise and three different rotations (at 120 degrees on the support plan of the marking), a final registration check may be conducted. This is done by highlighting one the tripod legs in the VR scene and render it in passthrough mode (e.g., as seen in view 608, which is a user view via the HMD 604). The user 606 confirms the correct ordering by selecting in the VR the right tripod leg. Due to the length of the robot platform, the kinematic deviations with respect to position may be centimeter accurate. This is swiftly verifiable by computing the point $\phi_{(E)}$ and displaying into the VR scene for the user to ratify the proper registration of the tetrahedron. With T_v~T_b it is possible to relate transformations among HMD 604, handheld controller (HHC) and 6D poses of tags by exploiting a robot operating system-transform system (ROS-TF) or network time protocol (NTP) mechanism for spatial and temporal alignment over the network.

Figure 7:
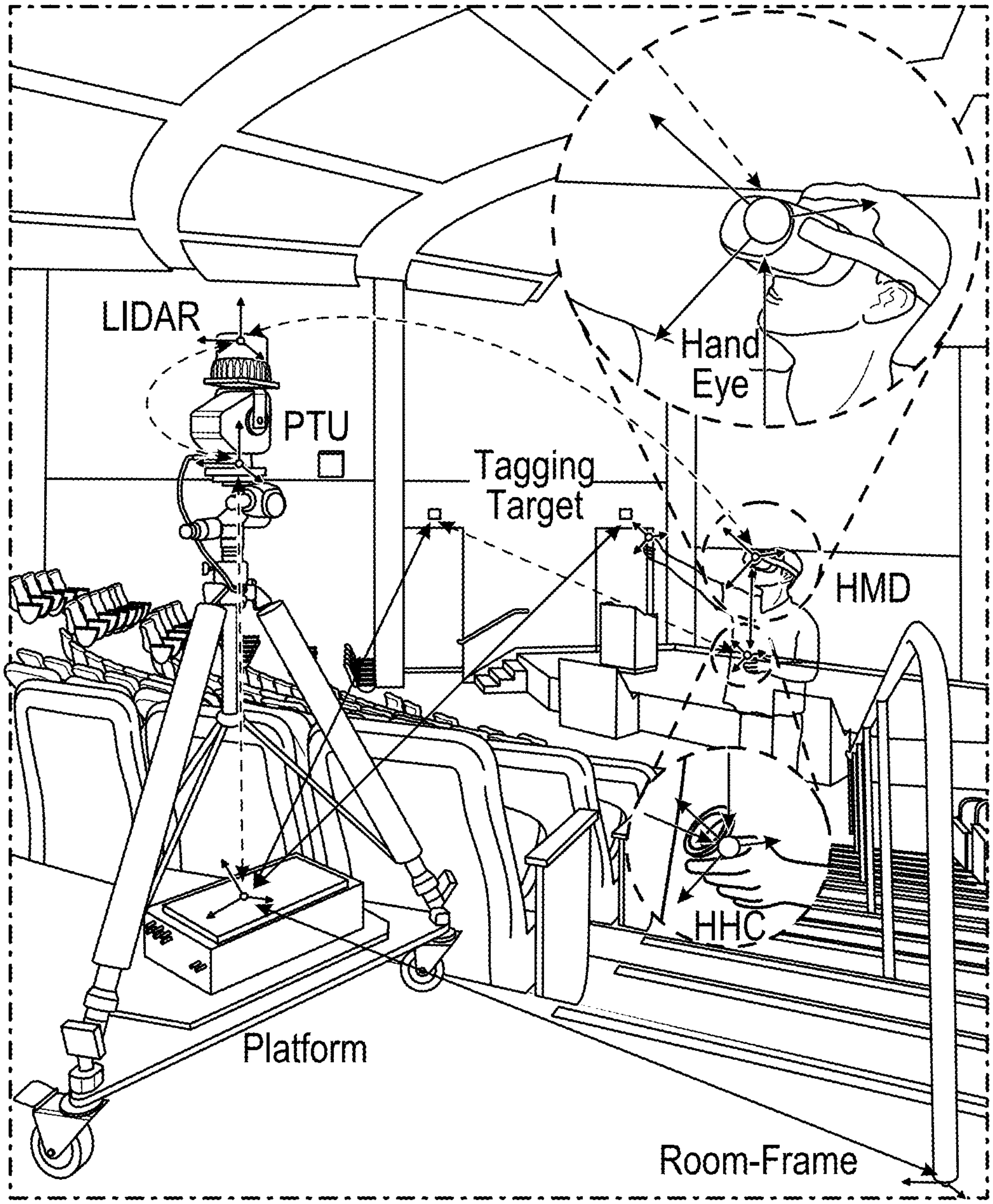
FIG. 7 illustrates functional tagging of environmental elements via mixed reality according to an example.

FIG. 7 illustrates functional tagging of environmental elements via mixed reality according to an example. The platform to room registration may be done using adaptive mapping as described above. An HMD may include a microphone to capture user utterances on demand. The user utterances may be converted, via speech-to-text to provide contextual cues for annotation of objects or locations around an environment. An annotation may be generated using language or ontology-based spatial affordances exploitation (e.g., extraction or ranking) for reliable cue insertion during functional-tag mapping. For example, Language cues (e.g., with respect to building elements, usage, appearance, or the like) of an environment, room, object, or user intent, may be used to selectively activate a point classification model or other trained model. An embedding feature-vector from a trained model may be injected into a neural-decoder for conditioning (e.g., biasing effects) the trained model. After training, the trained model may proactively analyze the environment in search of functional tag proposals. The systems and techniques described herein introduce an extensible way (by web ontologies, for example a building ontology representing topological relationships between entities in the building domain) to link or insert actionable language cues in the geometric, semantic and functional tagging processes.

Building ontologies may be used for defining class-names or employing relationships. Relationships may be described in a directed graph imposing a hierarchy between elements, classes, or super classes. For example, object and actions maps may be bound (e.g., via ontology languages) at each level of the ontological hierarchy through 3D spatial structure and metric attributes. Language cue integration in the tagging process may then be performed by adaptive tag proposals. For example, a trained model, via an interface system, may use words or minimal sentences (e.g., adjective plus noun plus verb) to adaptively modify which segmentation or classification models is being applied, and with which conditioning embeddings are point clouds decoded near to the pointing regions by the user. The trained model may suggest a particular annotation for an object or location, and a user may accept, deny, or modify the annotation. For example, the trained model may suggest that a current target is a door, and the user may accept the annotation.

Figure 8A:
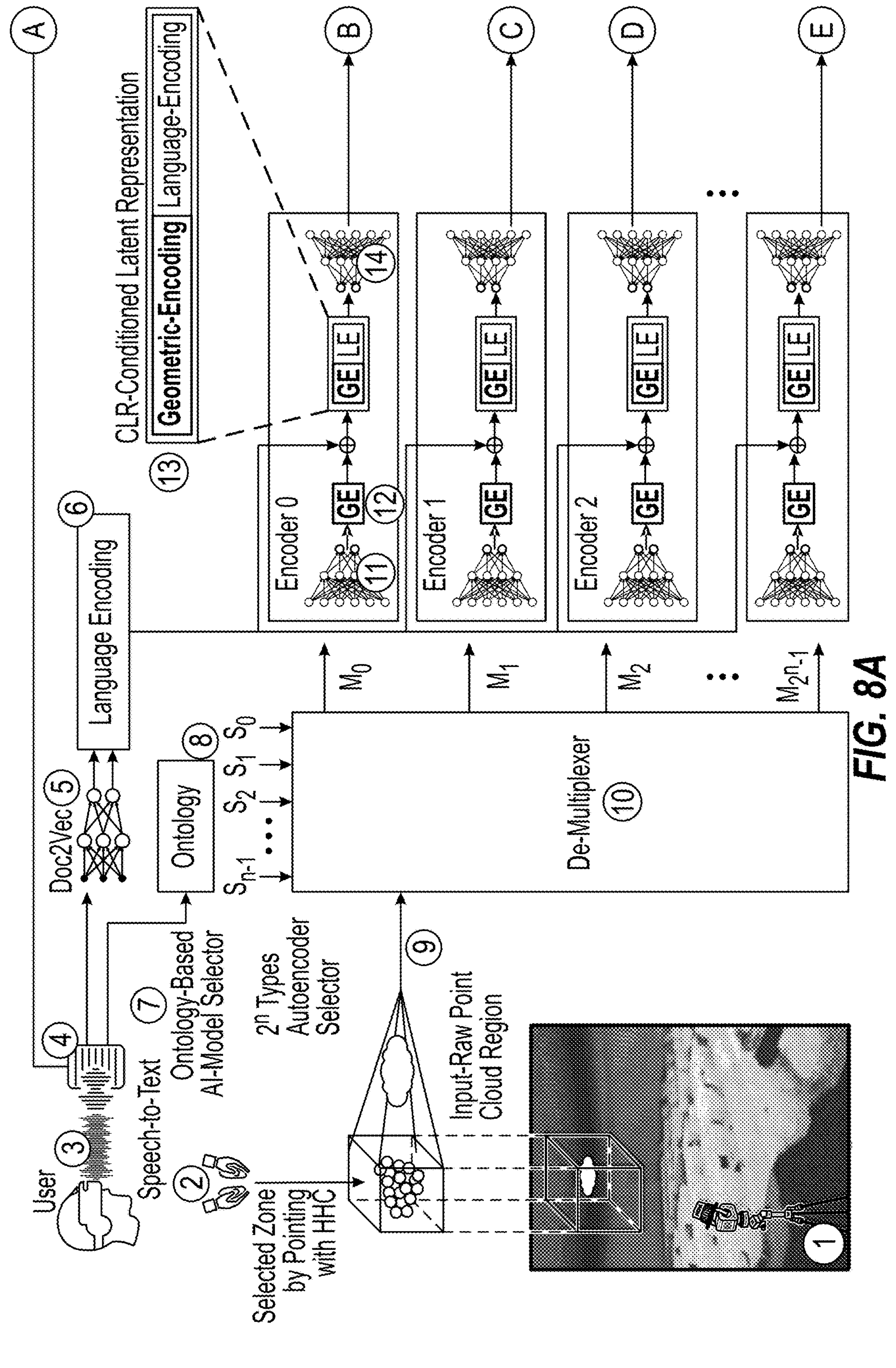
FIGS. 8A-8B illustrates a block diagram showing language-assisted spatial function mapping (e.g., saliency extraction and ranking) for rapid and reliable object-appearance-action insertion and tag proposal generation according to an example.
Figure 8B:
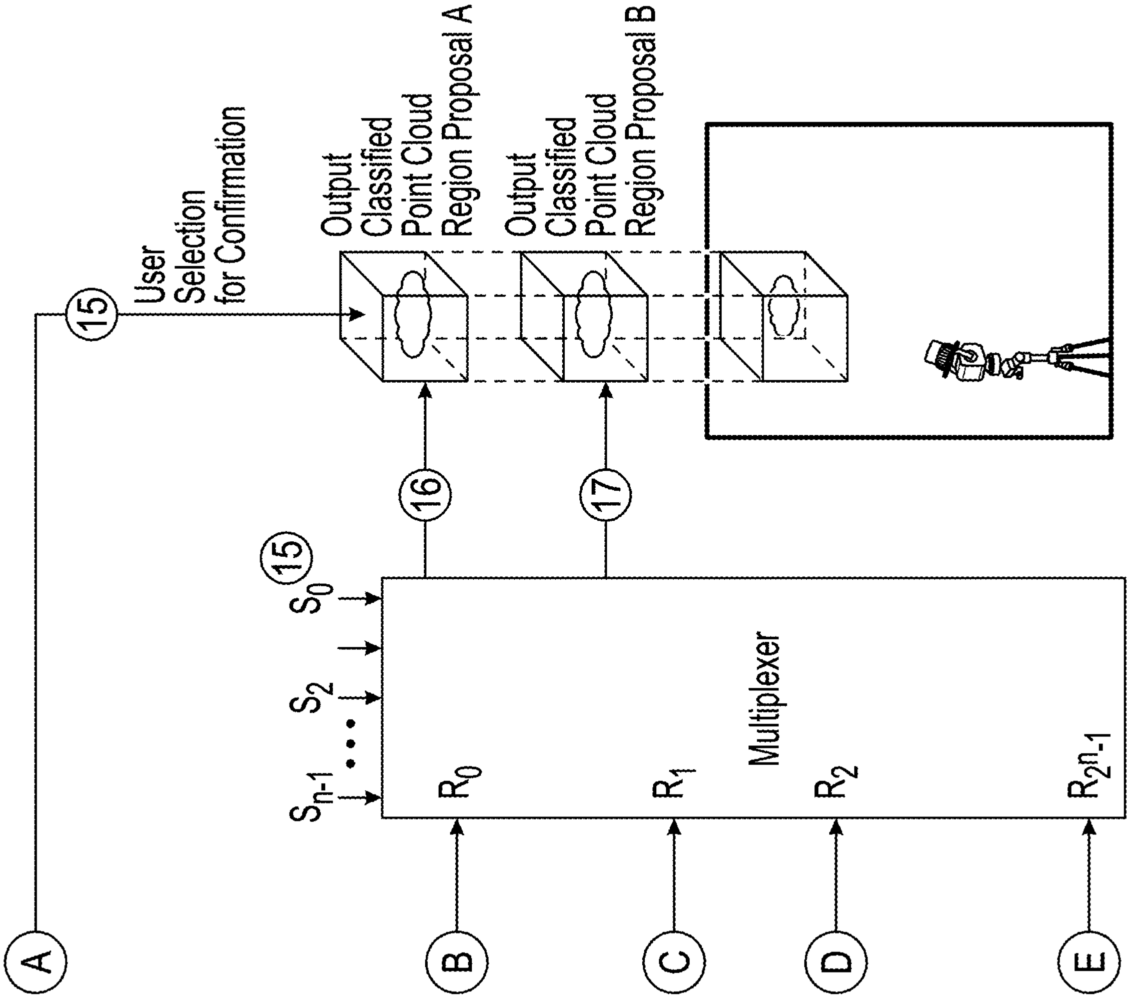

FIGS. 8A-8B illustrate a block diagram showing language-assisted spatial function mapping (e.g., saliency extraction and ranking) for rapid and reliable object-appearance-action insertion and tag proposal generation according to an example. The systems and techniques described herein use a user's language cues to prune and link nouns-to-entities and verbs-to-entities within an ontology and inject word-to-vector biasing-embeddings in 3D segmentation-decoders as described in the process flow of FIGS. 8A-8B.

A 3D point cloud acquisition may be captured by a robot. The high-resolution and regularly sample structure of the environment may be captured as described above. An XR head mounted display or handheld control may be used for tagging zone marking. A calibration and registration process may be used to connect the XR interface for a user to mark a point cloud in situ. For example, the user marks, via a 3D interface, a volume to process, for example, marking a "light switch" zone within a spherical or rectangular bounding region. This may not be a precision marking and may include a containing region cue to apply a trained model to generate informed proposals for segment points and generate functional tags.

In-situ language cues insertion may be done when a user marks a region to analyze. For example, the user may provide information, such as a sentence, via speech denoting an object or location. The information provided may include an optional action or attribute, for example "large gray door." A speech-to-text conversion may be used to convert the user's spoken utterance into text. The resulting text may be used in two branches of the process flows. In some examples, the text may be considered usable when nouns are within the vocabulary in the building ontology.

Language-embedding may be used for tagging an utterance. The utterance may be converted into a vector embedding for example using Doc2Vec or other similar approach, such as one trained on an architectural or building language corpus. This may be useful to obtain highly coherent semantic distance properties among typical annotations. An embedding may be used for selectively conditioning the segmentation autoencoder in later stages.

A text-to-ontology autoencoder may be used for selecting a class, subclass, etc. An autoencoder selection process may be used to reverse traversal along a building ontology for extraction of class, super class, associated classes, etc. For example, the autoencoder selection process may include how to go from a noun (e.g., "switch") to a collection of semantic and functional grounded classes. For example, with the noun "switch" in the vocabulary, the species of the noun may be asserted. For example, looking at the ontology structure, one level higher of abstraction for a genus (e.g., "distributed flow device") may be identified. Similarly, a Family, Order, Class, Phylum, or Kingdom may be obtained. At a lower level, related species may be identified to speech cues provided by the user.

Further in identifying the ontology of the user utterance, a taxonomy-genus autoencoder selection may be used. The taxonym elements at the genus-level that are active along the back traversal in the ontology may be used to define a set of active autoencoders. For example, by exploiting the language-base selector, a compact classifier trained in a subset of building elements may be used. The subset of building elements used may share a functional-grounding expressing a highly variable shape but tightly related functionality with a flexible degree of abstraction. This results in a list of active auto encoders to be applied for inference on the region of the scene.

Raw point cloud region data may be extracted, for example, with a distance-aware margin to migrate point noise and human marking limitations at large distances. Together with the set of active autoencoders, this input may be injected to the de-multiplexer to run one or more shallow autoencoders. This stage may direct marked zone with respect to contained points to a particular autoencoder depending on the language cues or active ontology classes. This allows for more compact trained models to run faster and with less energy consumption for example for these kinds of mobile mapping applications.

After demultiplexing, a point cloud geometric encoding may occur. A collection of point-cloud classification autoencoders may be split into encoder and decoder components to enlarge their embeddings with the langue embedding from the ontology. Features in geometric-semantic latent space may be identified. A feature attribute space may be created, which may be expanded by dimensional concatenation using the embeddings described above for language encoding. In some examples, a conditioned latent representation may be created as a feature vector of the expansion of structure, semantics, and language functional descriptors via embeddings. Point cloud functional decoding may be used to generate class association per point, associated with the language. The decoding may mitigate a large variability in shape by the prior use of the language cues provided by the user without large class cardinality models.

Continued on FIG. 8B, an output multiplexer may produce one or more visual proposals, for example ranking the sparsity and variability of the classified points. In some examples, only a single visual proposal may be provided. When multiple visual proposals are presented, a user may make a selection, such as by a single click, HHC gesture, etc. A proposal with a highest score may be overlayed on the 3D point cloud for confirmation. This accelerates the tagging process binding functionality with structure. In some examples, for proposals that are not dominate (e.g., those in a long tail in the confidence distribution), a non-maximal suppression may be applied to provide a maximum number of proposals (e.g., three to five). For example, a limited amount of an accumulative distribution function may be used to limit a number of proposals (e.g., ~96%, or 2-3 sigma).

The user may confirm a class or annotation. In some examples, one or more verbs associated in the taxonomy are presented to the user as toggling buttons to bind the object-shape, functional-descriptor, or affordance-association map. An XR menu may be provided to allow the user to insert a custom language cue or other security permission to an object. Stationarity attributes, for example "this door open state," "this door closed state," may allow functional estimation of aperture limits or estimation of a rotation axis. These physical functions may be used for integration of service robots and their associated tasks.

Figure 9:
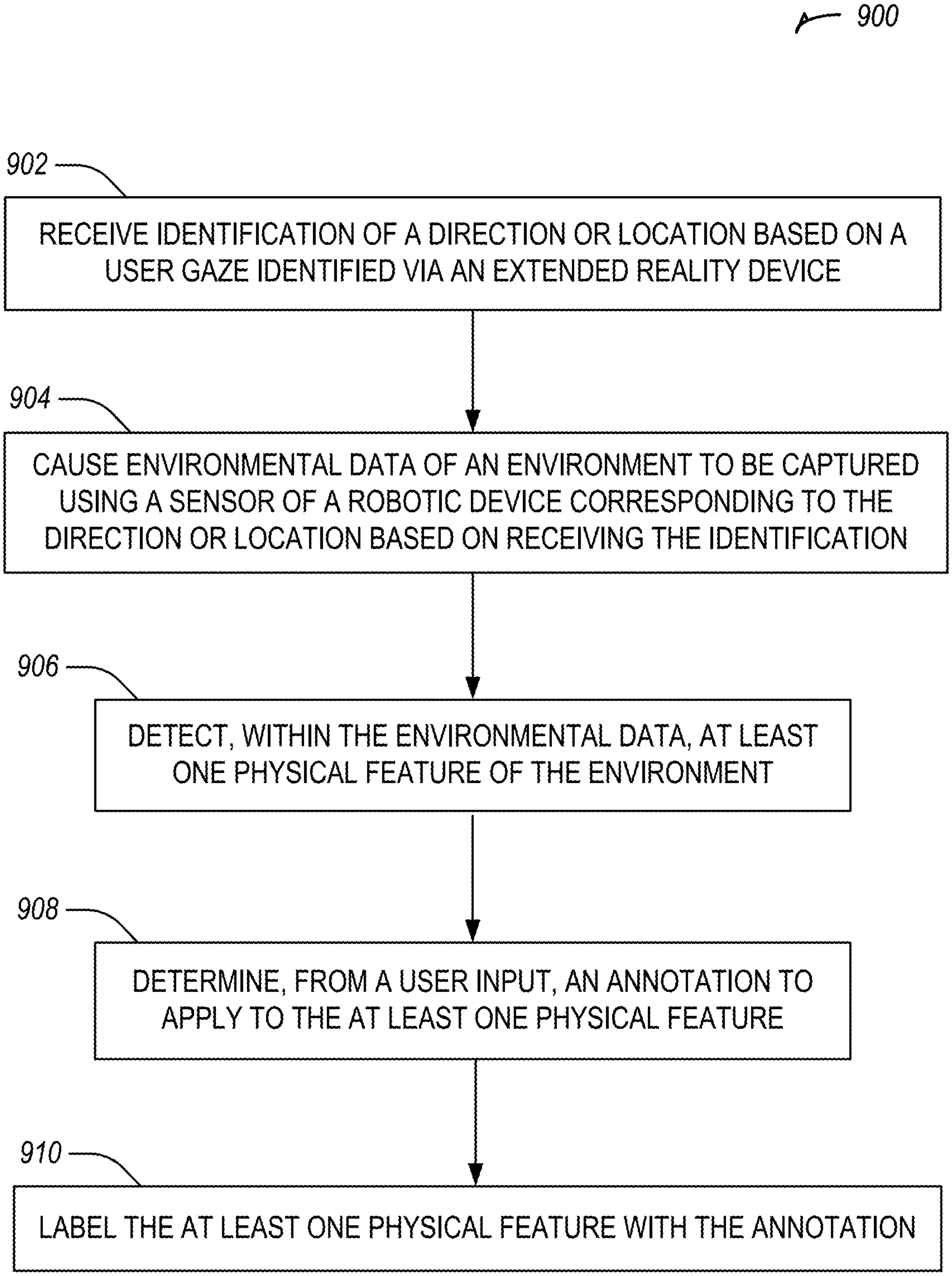
FIG. 9 illustrates a flowchart showing a technique for human-robot collaboration for 3d functional mapping according to an example.

FIG. 9 illustrates a flowchart showing a technique 900 for human-robot collaboration for 3d functional mapping according to an example. The technique 900 may be performed by a device or devices in an edge or datacenter network (e.g., an orchestrator, a base station, a server, a mobile device, an IoT device, or the like), by an autonomous mobile robot (AMR), etc.

The technique 900 includes an operation 902 to receive identification of a direction or location based on a user gaze identified via an extended reality device. In an example, the extended reality device is a head mounted display.

The technique 900 includes an operation 904 to cause environmental data of an environment to be captured using a sensor of a robotic device corresponding to the direction or location based on receiving the identification. In an example, the sensor is a video capture device and the environmental data includes a video or images. The sensor may be registered to the extended reality device in seven dimensions, for example including six degrees of freedom (e.g., x, y, z and pitch, yaw, roll) and time.

The technique 900 includes an operation 906 to detect, within the environmental data, at least one physical feature of the environment. In an example, the at least one physical feature of the environment is an object, a particular geometry, etc.

The technique 900 includes an operation 908 to determine, from a user input, an annotation to apply to the at least one physical feature. In an example, the user input includes a spoken utterance, and wherein determining the annotation from the spoken utterance includes using natural language processing.

The technique 900 includes an operation 910 to label the at least one physical feature with the annotation. In an example, operation 910 includes displaying an indication of the annotation in the extended reality device overlaid on or near the at least one physical feature, while permitting at least a portion of the environment to be visible through the extended reality device. Operation 910 may include an example using a machine learning trained model to determine that the annotation applies to the at least one physical feature. In this example, the technique 900 may include causing an indication to be displayed in the extended reality device, based on an output of the machine learning trained model, the indication suggesting that the annotation applies to the at least one physical feature, and receiving a user confirmation of the applicability of the annotation to the at least one physical feature. In this example, the machine learning trained model may be selected from a plurality of models based on a geometry of the at least one physical feature or the annotation.

In an example, the technique 900 may include determining voxel connectivity for captured portions of the environment and causing the robotic device to steer toward a region lacking point-sampling consistency in the voxel connectivity. In this example, causing the robotic device to steer may include using LIDAR.

The technique 900 may include an operation to perform voxel connectivity and density driven LIDAR steering towards regions lacking point-sampling consistency. This may include optimized (sampling and coverage) regularity guaranty achieved by a PoC producing ideal maps for downstream tasks in functional-tagging, segmentation and surface-modeling.

The technique 900 may include an operation to perform robust 7D (e.g., 6D Pose+1D Time) registration between sensor-actor unit (Pan-tilt-unit+LIDAR) and XR-HMD (extended Reality Head Mounted Display) exploiting simple and insightful mixed reality interactions between human-robot and XR controllers.

The technique 900 may include an operation to perform language and ontology-based spatial affordances exploitation (extraction/ranking) for easy and reliable cue insertion during functional-tags mapping.

In further examples, any of the compute nodes or devices discussed with reference to the present edge computing systems and environment may be fulfilled based on the components depicted in FIGS. 10A and 10B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 10A:
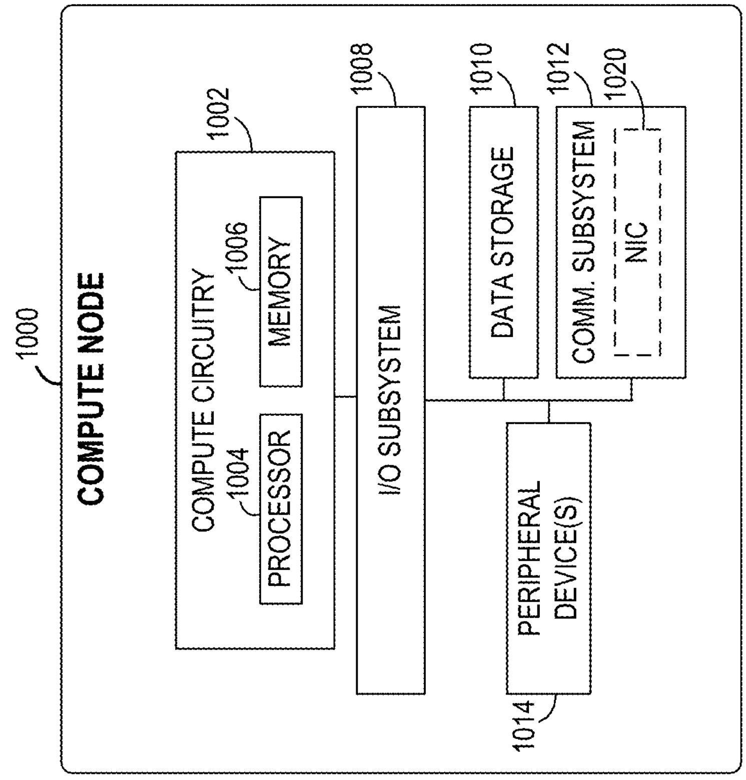
FIG. 10A provides an overview of example components for compute deployed at a compute node.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., a gateway of an implementing computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., a gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective compute node (whether a client, gateway, or aggregation node) in a computing system or like forms of appliances, computers, subsystems, circuitry, or other components.

Figure 10B:
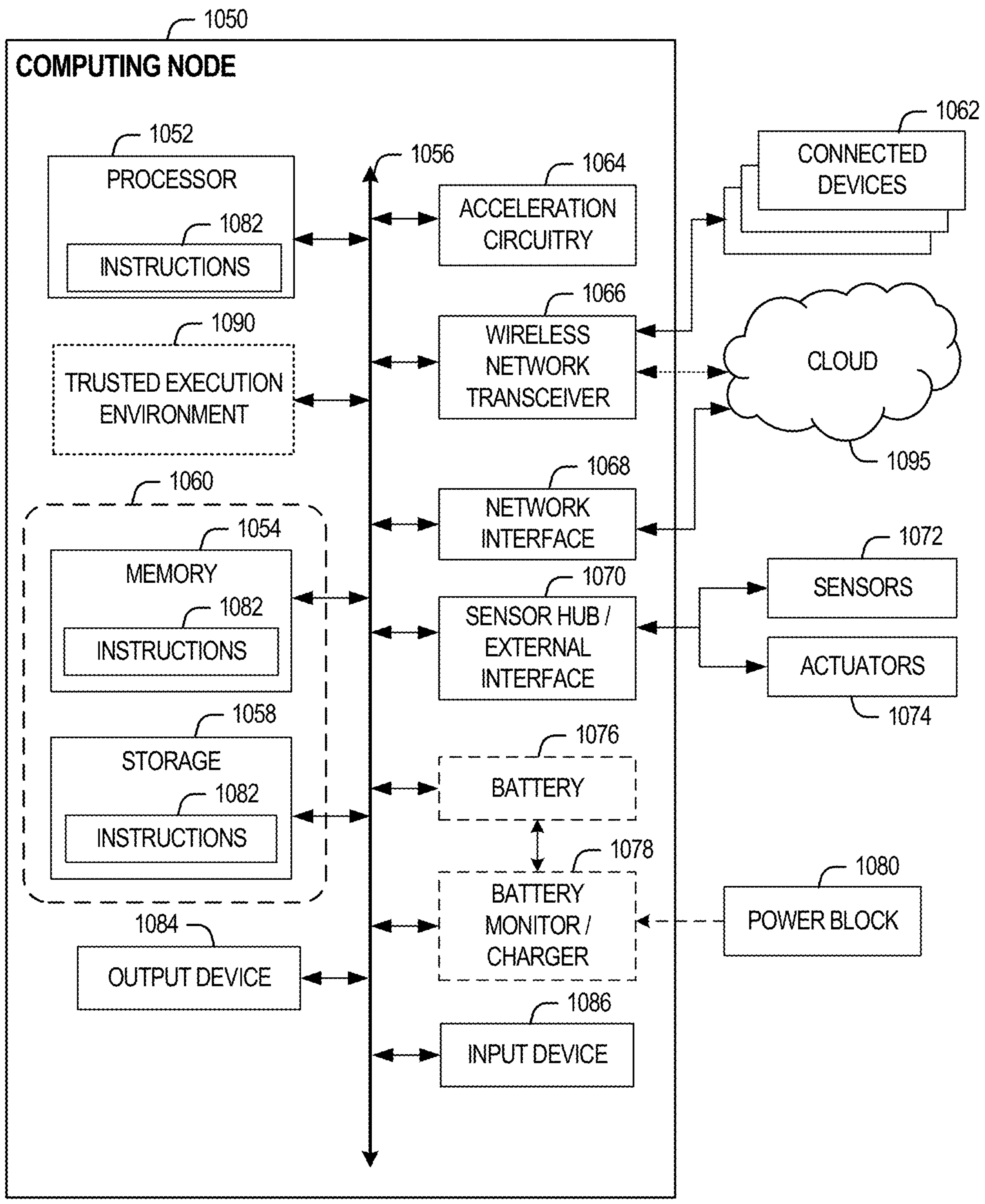
FIG. 10B provides a further overview of example components within a computing device.

In a more detailed example, FIG. 10B illustrates a block diagram of an example of components that may be present in a computing node 1050 for implementing the techniques (e.g., operations, processes, methods, and methodologies) described herein. This computing node 1050 provides a closer view of the respective components of node 1000 when implemented as or as part of a computing device (e.g., as a mobile device, a base station, server, gateway, etc.). The computing node 1050 may include any combinations of the hardware or logical components referenced herein, and it may include or couple with any device usable with an communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1050, or as components otherwise incorporated within a chassis of a larger system.

The computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the computing node 1050 may communicate with close devices, e.g., within about 10 meters, using a local transceiver based on Bluetooth Low Energy (BLE), or another low power radio, to save power. More distant connected devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the cloud 1095 via local or wide area network protocols. The wireless network transceiver 1066 may be a low-power wide-area (LPWA) transceiver that follows the IEEE 802.15.4, or IEEE 802.15.4g standards, among others. The computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the cloud 1095 or to other devices, such as the connected devices 1062 (e.g., operating in a mesh). The wired communication May provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the computing node 1050 to actuators 1074, such as power switches, valve actuators, an audible sound generator, a visual warning device, and the like.

In some optional examples, various input/output (I/O) devices may be present within or connected to, the computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1050. A display or console hardware, in the context of the present system, may be used to provide output and receive input of an computing system; to manage components or services of a computing system; identify a state of a computing component or service; or to conduct any other number of management or administration functions or service use cases.

A battery 1076 may power the computing node 1050, although, in examples in which the computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Such aspects of the inventive subject matter may be referred to herein, individually or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Figure 11:
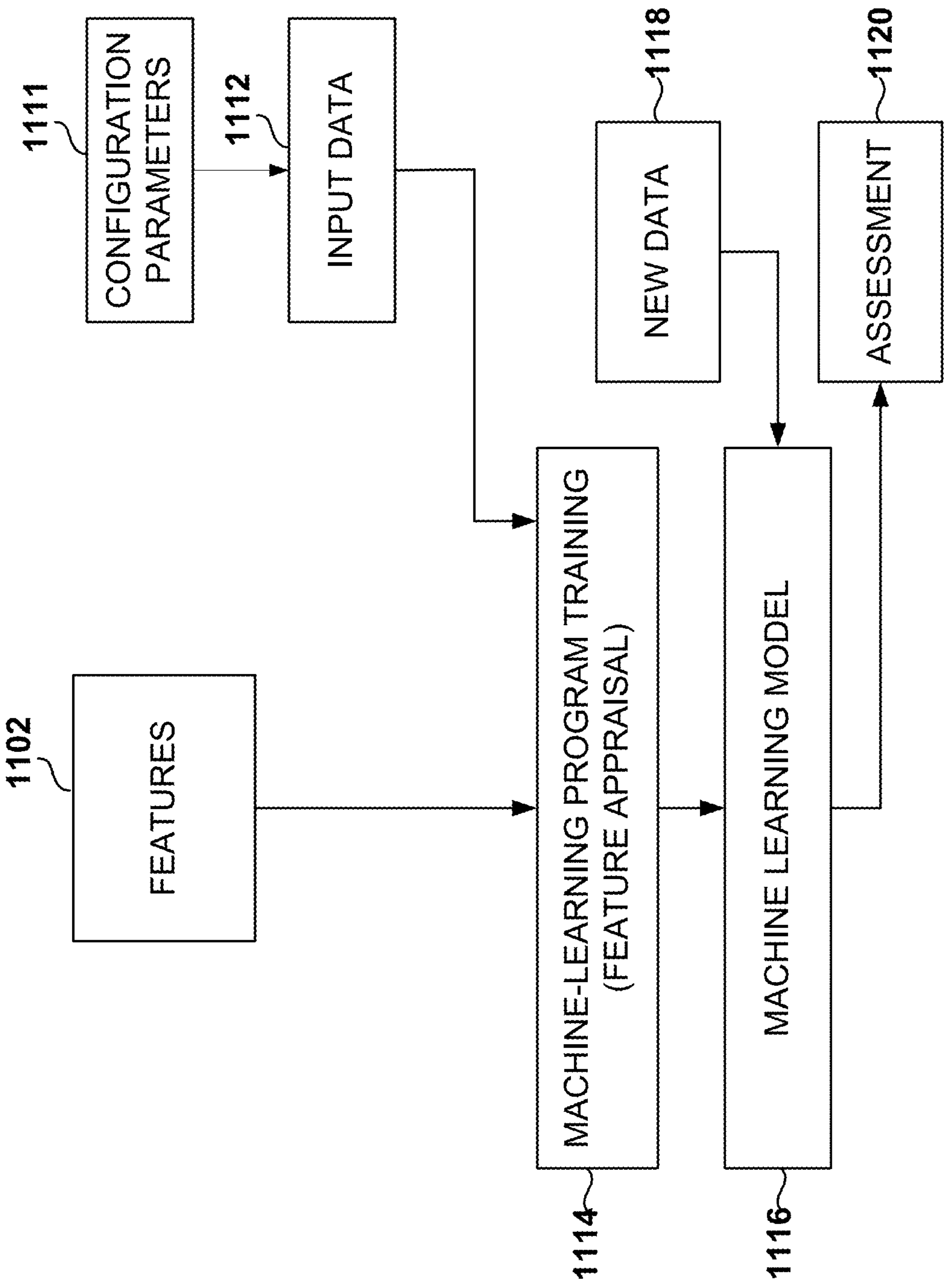
FIG. 11 illustrates training and use of a machine-learning program in accordance with some example examples.

FIG. 11 illustrates training and use of a machine-learning program in accordance with some example examples. In some example embodiments, machine-learning programs (MLPs), also referred to as machine-learning algorithms or tools, are used.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Although example embodiments are presented with respect to a few machine-learning tools, the principles presented herein may be applied to other machine-learning tools.

Unsupervised ML is the training of an ML algorithm using information that is neither classified nor labeled, and allowing the algorithm to act on that information without guidance. Unsupervised ML is useful in exploratory analysis because it can automatically identify structure in data.

Some common tasks for unsupervised ML include clustering, representation learning, and density estimation. Some examples of commonly used unsupervised-ML algorithms are K-means clustering, principal component analysis, and autoencoders. In some embodiments, example ML model 1116 outputs information, such as geometry or segmentation of an object, or is used for semantic understanding.

The machine-learning algorithms use data 1112 (e.g., action primitives or interaction primitives, goal vector, reward, etc.) to find correlations among identified features 1102 that affect the outcome. A feature 1102 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 1114, the ML algorithm analyzes the input data 1112 based on identified features 1102 and configuration parameters 1111 defined for the training (e.g., environmental data, state data, robot sensor data, etc.). The result of the training 1114 is an ML model 1116 that is capable of taking inputs to produce an output.

Training an ML algorithm involves analyzing data to find correlations. The ML algorithms utilize the input data 1112 to find correlations among the identified features 1102 that affect the outcome or assessment 1120. In some examples, the training data 1112 includes labeled data, which is known data for one or more identified features 1102 and one or more outcomes, such as accuracy of the input data.

The ML algorithms usually explore many possible functions and parameters before finding what the ML algorithms identify to be the best correlations within the data; therefore, training may make use of large amounts of computing resources and time, such as many iterations for a Reinforcement Learning technique.

Many ML algorithms include configuration parameters 1111, and the more complex the ML algorithm, the more parameters there are that are available to the user. The configuration parameters 1111 define variables for an ML algorithm in the search for the best ML model.

When the ML model 1116 is used to perform an assessment, new data 1118 is provided as an input to the ML model 1116, and the ML model 1116 generates the assessment 1120 as output.

Example 1 is at least one machine readable medium including instructions, which when executed by processing circuitry, cause the processing circuitry to perform operations comprising: receiving identification of a direction or location based on a user gaze identified via an extended reality device; causing environmental data of an environment to be captured using a sensor of a robotic device, the environmental data corresponding to the direction or location based on receiving the identification; detecting, within the environmental data, at least one physical feature of the environment; determining, from a user input, an annotation to apply to the at least one physical feature; and labeling the at least one physical feature with the annotation.

In Example 2, the subject matter of Example 1 includes, wherein the extended reality device is a head mounted display.

In Example 3, the subject matter of Examples 1-2 includes, wherein the sensor is a video or image capture device and the environmental data includes a video or images.

In Example 4, the subject matter of Examples 1-3 includes, wherein the at least one physical feature of the environment is a moveable object.

In Example 5, the subject matter of Examples 1-4 includes, wherein the user input includes a spoken utterance, and wherein determining the annotation from the spoken utterance includes using natural language processing.

In Example 6, the subject matter of Examples 1-5 includes, wherein labeling the at least one physical feature with the annotation includes displaying an indication of the annotation in the extended reality device overlaid on or near the at least one physical feature, while permitting at least a portion of the environment to be visible through the extended reality device.

In Example 7, the subject matter of Examples 1-6 includes, wherein the operations further comprise: determining voxel connectivity for captured portions of the environment; and causing the robotic device to steer toward a region lacking point-sampling consistency in the voxel connectivity.

In Example 8, the subject matter of Example 7 includes, wherein causing the robotic device to steer includes using LIDAR.

In Example 9, the subject matter of Examples 1-8 includes, wherein the sensor is registered to the extended reality device in seven dimensions including time.

In Example 10, the subject matter of Examples 1-9 includes, wherein labeling the at least one physical feature with the annotation includes using a machine learning trained model to determine that the annotation applies to the at least one physical feature.

In Example 11, the subject matter of Example 10 includes, wherein the operations further comprise causing an indication to be displayed in the extended reality device, based on an output of the machine learning trained model, the indication suggesting that the annotation applies to the at least one physical feature, and receiving a user confirmation of the applicability of the annotation to the at least one physical feature.

In Example 12, the subject matter of Examples 10-11 includes, wherein the machine learning trained model is selected from a plurality of models based on a geometry of the at least one physical feature or the annotation.

Example 13 is a system comprising: an extended reality device including a display, the extended reality device to output an indication of a direction or location based on a detected orientation or user gaze; and a robotic device including: a sensor to capture environmental data of an environment corresponding to the direction or location; processing circuitry; and memory, including instructions, which when executed by the processing circuitry, cause the processing circuitry to perform operations to: receive an identification of the direction or location from the extended reality device; detect, within the environmental data, at least one physical feature of the environment; determine, from a user input, an annotation to apply to the at least one physical feature; and label the at least one physical feature with the annotation.

In Example 14, the subject matter of Example 13 includes, wherein the extended reality device includes a head mounted display.

In Example 15, the subject matter of Examples 13-14 includes, wherein the sensor includes a video or image capture device and the environmental data includes a video or images.

In Example 16, the subject matter of Examples 13-15 includes, wherein the at least one physical feature of the environment is a moveable object.

In Example 17, the subject matter of Examples 13-16 includes, wherein the user input includes a spoken utterance captured by a microphone of the extended reality device, and wherein determining the annotation from the spoken utterance includes using natural language processing.

In Example 18, the subject matter of Examples 13-17 includes, wherein labeling the at least one physical feature with the annotation includes displaying an indication of the annotation, in the display of the extended reality device, overlaid on or near the at least one physical feature, while permitting at least a portion of the environment to be visible through the display.

In Example 19, the subject matter of Examples 13-18 includes, wherein the operations further comprise: determining voxel connectivity for captured portions of the environment; and causing the robotic device to steer toward a region lacking point-sampling consistency in the voxel connectivity.

Example 20 is an apparatus comprising: means for receiving identification of a direction or location based on a user gaze identified via an extended reality device; means for capturing environmental data of an environment, the environmental data corresponding to the direction or location based on receiving the identification; means for detecting, within the environmental data, at least one physical feature of the environment; means for determining, from a user input, an annotation to apply to the at least one physical feature; and means for labeling the at least one physical feature with the annotation.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one machine readable medium including instructions, which when executed by processing circuitry, cause the processing circuitry to perform operations comprising:

receiving identification of a direction or location based on a user gaze identified via an extended reality device;

causing environmental data of an environment to be captured using a sensor of a moveable robotic device by outputting a control signal to move the moveable robotic device, the environmental data corresponding to the direction or location based on receiving the identification, wherein the sensor is registered to the extended reality device in seven dimensions including six degrees of freedom comprising x, y, z position and pitch, yaw, roll orientation, and time, for spatial and temporal alignment between the sensor of the moveable robotic device and the extended reality device;

detecting, within the environmental data, at least one physical feature of the environment;

determining, from a user input, an annotation to apply to the at least one physical feature;

labeling the at least one physical feature with the annotation using a machine learning trained model to determine that the annotation applies to the at least one physical feature; and causing an indication to be displayed in the extended reality device, based on an output of the machine learning trained model, the indication suggesting that the annotation applies to the at least one physical feature, and receiving a user confirmation of the applicability of the annotation to the at least one physical feature.

2. The at least one machine readable medium of claim 1, wherein the extended reality device is a head mounted display.

3. The at least one machine readable medium of claim 1, wherein the sensor is a video or image capture device and the environmental data includes a video or images.

4. The at least one machine readable medium of claim 1, wherein the at least one physical feature of the environment is a moveable object.

5. The at least one machine readable medium of claim 1, wherein the user input includes a spoken utterance, and wherein determining the annotation from the spoken utterance includes using natural language processing.

6. The at least one machine readable medium of claim 1, wherein labeling the at least one physical feature with the annotation includes displaying an indication of the annotation in the extended reality device overlaid on or near the at least one physical feature, while permitting at least a portion of the environment to be visible through the extended reality device.

7. The at least one machine readable medium of claim 1, wherein the operations further comprise:

determining voxel connectivity for captured portions of the environment; and causing the robotic device to steer toward a region lacking point-sampling consistency in the voxel connectivity.

8. The at least one machine readable medium of claim 7, wherein causing the robotic device to steer includes using LIDAR.

9. The at least one machine readable medium of claim 1, wherein the machine learning trained model is selected from a plurality of models based on a geometry of the at least one physical feature or the annotation.

10. A system comprising:

an extended reality device including a display, the extended reality device to output an indication of a direction or location based on a detected orientation or user gaze; and a moveable robotic device including:

a sensor to capture environmental data of an environment corresponding to the direction or location after the moveable robotic device receives a control signal to move the moveable robotic device, wherein the sensor is registered to the extended reality device in seven dimensions including six degrees of freedom comprising x, y, z position and pitch, yaw, roll orientation, and time, for spatial and temporal alignment between the sensor of the moveable robotic device and the extended reality device;

processing circuitry; and memory, including instructions, which when executed by the processing circuitry, cause the processing circuitry to perform operations to:

receive an identification of the direction or location from the extended reality device;

detect, within the environmental data, at least one physical feature of the environment;

determine, from a user input, an annotation to apply to the at least one physical feature; and label the at least one physical feature with the annotation using a machine learning trained model to determine that the annotation applies to the at least one physical feature; and cause an indication to be displayed in the extended reality device, based on an output of the machine learning trained model, the indication suggesting that the annotation applies to the at least one physical feature, and receiving a user confirmation of the applicability of the annotation to the at least one physical feature.

11. The system of claim 10, wherein the extended reality device includes a head mounted display.

12. The system of claim 10, wherein the sensor includes a video or image capture device and the environmental data includes a video or images.

13. The system of claim 10, wherein the at least one physical feature of the environment is a moveable object.

14. The system of claim 10, wherein the user input includes a spoken utterance captured by a microphone of the extended reality device, and wherein determining the annotation from the spoken utterance includes using natural language processing.

15. The system of claim 10, wherein labeling the at least one physical feature with the annotation includes displaying an indication of the annotation, in the display of the extended reality device, overlaid on or near the at least one physical feature, while permitting at least a portion of the environment to be visible through the display.

16. The system of claim 10, wherein the operations further comprise:

determining voxel connectivity for captured portions of the environment; and causing the robotic device to steer toward a region lacking point-sampling consistency in the voxel connectivity.

17. An apparatus comprising:

means for receiving identification of a direction or location based on a user gaze identified via an extended reality device;

means for capturing environmental data of an environment by outputting a control signal to move a moveable robotic device, the environmental data corresponding to the direction or location based on receiving the identification, wherein a sensor of the moveable robotic device is registered to the extended reality device in seven dimensions including six degrees of freedom comprising x, y, z position and pitch, yaw, roll orientation, and time, for spatial and temporal alignment between the sensor of the moveable robotic device and the extended reality device;

means for detecting, within the environmental data, at least one physical feature of the environment;

means for determining, from a user input, an annotation to apply to the at least one physical feature; and means for labeling the at least one physical feature with the annotation using a machine learning trained model to determine that the annotation applies to the at least one physical feature; and means for causing an indication to be displayed in the extended reality device, based on an output of the machine learning trained model, the indication suggesting that the annotation applies to the at least one physical feature, and receiving a user confirmation of the applicability of the annotation to the at least one physical feature.

* * * * *